US012199395B2

(12) United States Patent
Riechmann

(10) Patent No.: US 12,199,395 B2
(45) Date of Patent: Jan. 14, 2025

(54) METHOD AND DEVICE FOR MONITORING THE STATE OF PRESSING ELEMENTS OF A CRIMPING DEVICE

(71) Applicant: HARTING ELECTRIC GMBH & CO. KG, Espelkamp (DE)

(72) Inventor: Till Riechmann, Stemwede (DE)

(73) Assignee: HARTING ELECTRIC GMBH &CO. KG, Espelkamp (DE)

( * ) Notice: Subject to any disclaimer, the term of this patent is extended or adjusted under 35 U.S.C. 154(b) by 0 days.

(21) Appl. No.: 17/423,406

(22) PCT Filed: Jan. 10, 2020

(86) PCT No.: PCT/DE2020/100016
§ 371 (c)(1),
(2) Date: Jul. 15, 2021

(87) PCT Pub. No.: WO2020/147888
PCT Pub. Date: Jul. 23, 2020

(65) Prior Publication Data
US 2022/0077642 A1 Mar. 10, 2022

(30) Foreign Application Priority Data
Jan. 16, 2019 (DE) ..................... 10 2019 101 017.9

(51) Int. Cl.
*H01R 43/048* (2006.01)

(52) U.S. Cl.
CPC ....... *H01R 43/048* (2013.01); *H01R 43/0486* (2013.01)

(58) Field of Classification Search
CPC .. H01R 43/048; H01R 43/0486; H01R 4/183; H01R 43/0488; B30B 15/26;
(Continued)

(56) References Cited

U.S. PATENT DOCUMENTS 4,856,186 A * 8/1989 Yeomans ........... H01R 43/0486 29/748
4,916,810 A 4/1990 Yeomans
(Continued)

FOREIGN PATENT DOCUMENTS

CN 101227053 A 7/2008
CN 101227056 A 7/2008
(Continued)

OTHER PUBLICATIONS

European Patent Office, International Search Report and Written Opinion for international application No. PCT/DE2020/100016, mailed May 27, 2020, 16 pages (with English translation of International Search Report).
(Continued)

*Primary Examiner* — Donghai D Nguyen
(74) *Attorney, Agent, or Firm* — Seed IP Law Group LLP

(57) ABSTRACT

A method for monitoring the state of pressing elements of a crimping device of a crimping apparatus includes: setting of a crimping height; measuring of a travel from a rest position to a working position of the pressing elements, which working position corresponds to the set crimping height; comparing of the travel with a travel from the rest position to a working position of the pressing elements of a setting operation of a crimping height, which setting operation was carried out before the setting operation of the crimping height; recording of data, wherein the recorded data comprises at least one result of the comparison; testing of the comparison for the presence of a predefined criterion; and outputting of a signal if the predefined criterion is satisfied.

18 Claims, 5 Drawing Sheets

(58) Field of Classification Search
CPC ........... B30B 15/0094; Y10T 29/49185; Y10T 29/53209; Y10T 29/53235
See application file for complete search history.

(56) References Cited

U.S. PATENT DOCUMENTS

| | | | | |
|---|---|---|---|---|
| 5,152,162 | A * | 10/1992 | Ferraro | H01R 43/0486 29/720 |
| 5,937,505 | A | 8/1999 | Strong et al. | |
| 8,671,551 | B2 * | 3/2014 | Yost | H01R 43/0486 324/537 |
| 9,362,699 | B2 * | 6/2016 | Stull | H01R 43/048 |
| 9,800,008 | B2 | 10/2017 | Morris et al. | |
| 9,871,335 | B2 | 1/2018 | Deck | |
| 2008/0172864 | A1 | 7/2008 | Yagi et al. | |
| 2008/0172865 | A1 | 7/2008 | Yagi et al. | |
| 2011/0034091 | A1 | 2/2011 | Kobayashi et al. | |
| 2012/0067097 | A1 | 3/2012 | Wagner et al. | |
| 2012/0137486 | A1 | 6/2012 | Charlton et al. | |
| 2014/0041200 | A1 | 2/2014 | Hofmeister | |
| 2014/0083149 | A1 | 3/2014 | Wagner et al. | |
| 2018/0309256 | A1 | 10/2018 | Glockseisen | |

FOREIGN PATENT DOCUMENTS

| | | | |
|---|---|---|---|
| CN | 101542851 | A | 9/2009 |
| CN | 201303195 | Y | 9/2009 |
| CN | 101997176 | A | 3/2011 |
| CN | 102380825 | A | 3/2012 |
| CN | 103682936 | A | 3/2014 |
| CN | 106129643 | A | 11/2016 |
| CN | 106457724 | A | 2/2017 |
| CN | 107081677 | A | 8/2017 |
| DE | 690 18 351 | T2 | 11/1995 |
| DE | 10 2007 063 669 | A1 | 5/2009 |
| EP | 0 419 129 | A1 | 3/1991 |
| EP | 1 071 173 | A2 | 1/2001 |
| EP | 2 313 235 | B1 | 12/2011 |
| WO | 2010/136346 | A1 | 12/2010 |
| WO | 2012/110310 | A1 | 8/2012 |
| WO | 2012/163866 | A1 | 12/2012 |

OTHER PUBLICATIONS

German Patent Office, Office Action for German application No. 10 2019 101 017.9 dated Feb. 28, 2020, 9 pages.

Kabel Forum, "Grundlagen der Crimptechnik," Sep. 2005, 12 pages.

International Preliminary Report on Patentability; dated Jan. 10, 2020; for International Application No. PCT/DE2020/100016, 9 pages.

* cited by examiner

| E(n) | #C | H | ΔH | ΣΔH | X | ΔX | ΣΔX | V |
|---|---|---|---|---|---|---|---|---|
| 1 | 0 | H(1) | 0 | 0 | X(1) | 0 | 0 | ΣΔH(n) + ΣΔX(n) ≙ Σ#C(n) |
| 2 | 10.000 | H(2) | ΔH(2) | ΔH(2) | X(2) | ΔX(2) | ΔX(2) | |
| 3 | 20.000 | H(3) | ΔH(3) | ΣΔH(3) | X(3) | ΔX(3) | ΣΔX(3) | |
| n | 40.000 | H(n) | ΔH(n) | ΣΔH(n) | X(n) | ΔX(n) | ΣΔX(n) | |
| ΔH(n) = ΔH(n) - ΔH(n-1) | | | | ΔX(n) = ΔX(n) - ΔX(n-1) | | | | $\sum_{n=1}^{n}(n)$ |

METHOD AND DEVICE FOR MONITORING THE STATE OF PRESSING ELEMENTS OF A CRIMPING DEVICE

BACKGROUND

Technical Field

The invention relates to a method for monitoring the state of a crimping device and a crimping apparatus suitable for carrying out the method. The invention relates in particular to a method using a sensor system for measuring a travel of pressing elements of a crimping device.

In crimping, two components are connected to one another by plastic deformation by means of a shaping tool using a pressing force. A crimp is achieved, that is to say a mechanical connection which is difficult to detach between a conductor and a connecting element, for example a plug or a sleeve.

During the production of the crimp, a high quality of the crimp is desirable for a permanent mechanically and electrically stable connection between the crimped components. A crimp having a deficient quality can be caused in particular by a flawed crimping blank and also by operating errors on a crimping apparatus, such as incorrectly set crimping height, and in particular also by wear of the pressing elements.

Ensuring the quality of a crimped connection is conventionally usually carried out by measuring the crimping depth, by an optical judgment of a microsection, and/or by force/travel monitoring during the crimping.

DESCRIPTION OF THE RELATED ART

WO 2012/110310 A1 proposes an above-mentioned force/travel monitoring during the crimping. A crimping blank is plastically deformed by a shaping tool. In particular during the retraction of the shaping tool, both the force which the shaping tool exerts on the crimping blank and also the travel by which the shaping tool is displaced are measured by means of a sensor system. A travel change between a position at maximum force and an initially force-free position is used as an indicator of an elastic back deformation of the crimping blank. This indicator is proposed as a measure of the quality of the produced crimp.

The method proposed by WO 2012/110310 A1 is not suitable for ascertaining a possible cause of a crimp having undesired quality.

EP 2 313 235 B1 proposes a method for monitoring the wear of a crimping tool, in which the pressing elements can be pressed on a workpiece and a pressing amount to be achieved by actuating the crimping tool is settable using a pre-setting device. In the method, a reference position and a wear position of the presetting device are detected in an unworn or used state of the pressing elements. The pressing elements are moved in an actuated state of the crimping tool by adjusting the presetting device into a position having a or the reference pressing amount. The comparison of the worn position to the reference position supplies a wear measure.

The adjustment of the presetting device is carried out using a knurled screw, the rotation of which is measured using an incremental rotary encoder.

BRIEF SUMMARY

Embodiments of the invention provide a method for monitoring the state of a crimping device and an apparatus suitable for carrying out the method. In particular, embodiments of the invention provide a method for monitoring the state of pressing elements of an indent crimping apparatus and in particular a four-indent crimping apparatus.

An embodiment of the present invention relates in particular to a method for monitoring the state of pressing elements of a crimping device of a crimping apparatus, in which in a first step a crimping height is configured, and in a second step a travel from a defined rest position to a working position of the pressing elements is measured, which corresponds to the set crimping height.

In a crimping apparatus, during the crimping in particular of a predetermined cable with a predetermined contact sleeve, the pressing elements of the crimping device are moved toward one another with application of pressure. The contact sleeve provided with the cable is arranged between the pressing elements and is compressed with the cable under the pressure of the pressing elements. For a desirable mechanically and electrically stable connection, a predetermined suitable crimping height is provided, up to which the pressing elements act on the contact sleeve and the cable.

A cable mentioned in the entire context of the application can have in particular an electrical conductor, for example a "stranded conductor", wherein the electrical conductor can also be a core of a multicore cable in particular, which can be a strand having a plurality of individual wires. In this context, it is to be noted with respect to the term cable that when reference is made here above and in the entire context of the application to a cable to be crimped in particular, this always means a stripped core of a single core or multicore cable to be crimped, the strands of which can in particular also have a plurality of individual wires.

In particular in an indent crimping apparatus such as a two-indent crimping apparatus and a four-indent crimping apparatus, the pressing elements can be formed as opposing pointed mandrels. The crimping height is the minimal distance between two opposing mandrels, up to which the mandrels are moved toward one another during the crimping.

A suitable crimping height for a predetermined contact sleeve and a predetermined cable can be set using adjustment mandrels having a suitable diameter using a suitable setting mechanism. A predetermined adjustment mandrel is arranged between the pressing elements of the crimping device, and the pressing elements are moved from the defined rest position thereof toward the adjustment mandrel until the tips of the pressing elements touch the adjustment mandrel. The crimping height is configured when the adjustment mandrel is displaceable between the pressing elements touching it and corresponds to the diameter of the adjustment mandrel.

The adjustment mandrel is suitably not arranged between the pressing elements of the crimping device during the setting of the crimping height as the pressing elements are moved together, in order to protect the adjustment mandrel from damage in the event of a crimping height set too small for its diameter. The adjustment mandrel is instead inserted after the pressing elements are moved together into the hole remaining between the pressing elements. The diameter of the adjustment mandrel corresponds approximately to the set crimping height when the adjustment mandrel can be inserted with difficulty under a predetermined friction with the pressing elements into the existing hole.

By way of the above measurement of the travel of the pressing elements from the rest position thereof to the working position thereof and in particular to the position thereof which corresponds to the set crimping height, a comparable reference travel is provided simply and advantageously. In particular using a sensor system described hereinafter, the travel can already be measured in an idle state of the crimping device and particularly advantageously also routinely during an above-described configuration of a crimping height.

In a third step, the measured travel is compared to a recorded travel of a measurement of a travel of a configuration of a crimping height previously carried out using the method. If wear of the pressing elements exists, in particular the tips thereof are worn. Accordingly, the tips of opposing pressing elements of worn pressing elements can be spaced apart further from one another when carrying out a crimp than the tips of new and/or unworn pressing elements. Accordingly, the travel of worn pressing elements from the rest position thereof to the working position, which corresponds to the set crimping height, is greater than the travel of new and/or unused pressing elements.

By way of the above advantageous comparison of the travel of the pressing elements from the rest position thereof to the position thereof which corresponds to the set crimping height, the degree of the wear of the pressing elements between the two measurements can therefore be ascertained in a simple manner. The comparison can be ascertained, for example, from the ratio of the two measured travels and/or particularly advantageously by the difference thereof.

In a fourth step, data are recorded, wherein the recorded data comprise at least the measured travel and/or a result of the comparison. The method can be carried out suitably using suitable software, which is provided on an evaluation electronics unit of a crimping apparatus. The data are stored in a suitable manner on the evaluation electronics unit and are thus advantageously available for carrying out the method further times and for corresponding further comparisons.

In a fifth step of the method according to an embodiment of the invention, the comparison carried out in the third step is checked for the presence of a predetermined criterion, after which a signal is output in a sixth step if the predetermined criterion is fulfilled. In this way, it can advantageously also be checked and recognized routinely whether maintenance of the crimping device is desirable or a replacement of worn pressing elements is required for crimps having a desired quality. The signal can be an optical and/or acoustic display and/or can trigger a predetermined measure, for example setting a crimping apparatus into a predetermined operating mode, which can be a maintenance mode, for example.

The above method according to an embodiment of the invention can routinely be carried out after carrying out a predetermined number of crimps and/or can be carried out particularly advantageously in each case upon the configuration of a predetermined crimping height for a batch of a predetermined piece count of contacts to be crimped. As described hereinafter, the method is advantageously capable of also specifying an estimation from the comparison as to what extent the pressing elements are suitable for a predetermined number of crimps.

If the method is carried out repeatedly, in the third step, the comparison of the travel to the recorded travel can suitably be carried out in consideration of the configured crimping height and the crimping height of the configuration of a crimping height previously carried out using the method. In the fourth step, in addition the set crimping height and/or a result of a comparison of the set crimping height to the crimping height of the configuration of a crimping height previously carried out using the method are recorded. In this way, the state of the pressing elements can advantageously be checked routinely upon the configuration of different crimping heights as well. Otherwise, only a configuration can be checked for a deviation, the crimping height of which corresponds to the crimping height of a previously configured crimping height.

In step one of an above method according to an embodiment of the invention, a configuration E(n) of a crimping height H(n) can be carried out, wherein n is the number of the configurations E(n) of a crimping height H(n) carried out using the pressing elements of the crimping device, and wherein a reference measure of a reference crimping height H(n) is used for the crimping height H(n), which can suitably correspond to half the actually configured crimping height. When reference is made hereinabove and hereinafter and in particular also with reference to FIG. 4A, FIG. 4B, and FIG. 5 and in the claims to a crimping height H(n), for the sake of simplicity, this always means the reference crimping height H(n), which corresponds to half an actually configured crimping height using an adjustment mandrel having a predetermined diameter of the actual crimping height.

In step two, a travel X(n) of the pressing elements of the crimping device from a first P0(*n*) to a second position P1(*n*) is measured, wherein the pressing elements are in the rest position thereof in the first position P0(*n*) and are in a working position in the second position P1(*n*), which corresponds to the set crimping height H(n).

In above-described step three, a comparison of the travel X(n) of the configuration E(n) to a travel X(n−1) of a configuration E(n−1) of a crimping height H(n−1) carried out before the configuration E(n) of the crimping height H(n) can be carried out by way of observation of the ratio of the measured travel X(n) to the travel X(n−1), namely X(n)/X(n−1) and in particular by way of observation of the difference of the measured travel, namely ΔX(n)=X(n)−X(n−1).

In above-described step four, the recorded data can comprise at least the travel X(n) and/or the existing difference ΔX(n) of a configuration E(n). Upon recording of the difference ΔX(n), the possibility is advantageously provided of summing in step three over all recorded differences ΔX(n) of all configurations E(n) carried out, namely forming the sum ΣΔX(n), wherein summing is carried out from 1 to n.

In step five described at the outset, a comparison of the difference ΔX(n) to a predetermined deviation can be carried out, after which in above step six, a signal is output if the comparison fulfills a predetermined criterion. The comparison carried out above in step five can be ascertained from the ratio and/or the difference of the deviation to/from the difference ΔX(n).

The preceding configuration E(n−1) is suitably the configuration (E) carried out before the configuration E(n), wherein the travel X(n−1) of the configuration E(n−1) in the third step is read from data recorded during the configuration E(n−1) in step four.

The data read out in step three and/or the data recorded in step four can additionally comprise the number n and/or the first crimping height H(n) in addition to the travel X(n) and/or the difference ΔX(n).

It is advantageous in the third step to additionally compare the crimping height H(n) to the second crimping height H(n−1), wherein the comparison can be derived from the ratio and/or in particular the difference thereof, namely ΔH(n)=H(n)−H(n−1), wherein the data read out in step three and/or the data recorded in step four can additionally comprise the difference ΔH(n). In this way, the possibility is advantageously provided of carrying out and comparing a plurality of configurations E(n) having different crimping heights H(n) and checking each configuration E(n) for a deviation of the travel X(n). Otherwise, only one configuration E(n) can be checked for a deviation, the crimping height H(n) of which corresponds to the crimping height H(n) of a previously configured crimping height H(n).

This is because the possibility is advantageously provided in this way of, in addition to the above-described sum ΣΔX(n), additionally summing over all recorded differences ΔH(n) of all configurations E(n) carried out, namely forming the sum ΣΔH(n), wherein summing is carried out from 1 to n.

In addition, the data read out in step three and/or the data recorded in step four can additionally suitably comprise the sum ΣΔX(n) and ΣΔH(n), whereby the possibility is advantageously provided in step three of additionally taking into consideration ΔX(n) and ΔH(n) of all configurations by means of the ratio and/or sum thereof. The sum ΣΔH(n)+ΔX(n), namely ΣΔH(n)+ΔX(n) can be formed suitably here.

The sum ΣΔH(n)+ΔX(n) can be compared in the above-described fifth step to the predetermined deviation, and a signal can be output in the sixth step if this comparison fulfills a predetermined criterion. The data read out in the third step and/or the data recorded in step four can suitably comprise the sum ΣΔH(n)+ΔX(n) here.

The sum ΣΔH(n)+ΔX(n) is particularly advantageous for checking for the presence of a predetermined criterion of a comparison to the predetermined deviation because in this way arbitrarily many configurations E(n) having arbitrarily many crimping heights H(n) can also be used routinely for the method according to an embodiment of the invention.

The data recorded in step four can each be recorded suitably with assignment to a configuration E(n). For example, the recorded data of a configuration E(n), namely n, X(n), H(n) and/or ΔX(n) and/or ΔH(n) and/or ΣΔX(n) and/or ΣΔH(n) and/or ΣΔH(n)+ΔX(n) can be saved in tabular form in corresponding lines and columns. When recording the sum ΣΔH(n)+ΔX(n), in addition all data of a configuration E(n), which are associated with configurations E(n) previously carried out can be deleted. In this way, it is advantageously possible to keep a storage space required for the recorded data small.

A method according to the invention can additionally suitably have a further step, in which the crimps C carried out after configuration E(n) of a crimping height H(n) are counted, namely the number #C(n), and the number #C(n) is recorded together with the recorded data, after which the data read out in step three can additionally comprise the number #C(n) of a configuration E(n).

In this way, the possibility is advantageously provided that the signal output in step six can comprise, in addition to a report of a presence of a predetermined criterion, a deviation and/or the sum ΣΔH(n)+ΔX(n), the number #C(n), and/or the sum of all crimps Σ#C(n) which have been carried out of all configurations E(n), according to which upon a configuration E(n) of a crimping height (n), a prognosis can be created about a suitability to be expected of the pressing elements for a number of crimps to be carried out.

In the fourth step, for this purpose in each case the sum of the crimps Σ#C(n) carried out is recorded together with the recorded data, and in step three, the sum Σ#C(n) is read out.

The method according to embodiments of the invention is particularly suitable for monitoring the operating state of a crimping device of a crimping apparatus described hereinafter, the pressing elements of which are formed as conical pointed mandrels. The tips of the mandrel can suitably be formed rounded and/or can have comparatively small protrusions.

In the method, a relative travel measurement of the travel X(n) is carried out suitably using a position transmitter having a Hall sensor, which can be provided on a device for applying pressure to the crimping device. Position transmitters having Hall sensors have a desirable measurement accuracy and can be acquired comparatively inexpensively.

Embodiments of the invention accordingly additionally relate in particular to a crimping apparatus for checking the quality of a crimp of a predetermined cable with a predetermined contact sleeve and with a predetermined crimping height using an above-described sensor for measuring a travel of a device for actuating a crimping device and an evaluation electronics unit.

A crimping apparatus particularly suitable for compressing the cable with a contact sleeve, which is turned in particular, can advantageously be an indent crimping apparatus, for example a two-indent crimping apparatus and particularly preferably a four-indent crimping apparatus.

As a device for actuating the crimping device, the crimping apparatus suitably has a pneumatic pressure device having a cylinder and a piston, which is operationally connected via a lever to the crimping device. The crimping device can have a cylindrical guide for this purpose, in which the pressing elements are mounted so they are radially movable. The lever is pivotably arranged around the axis of the guide and has an inner contour which interacts with the pressing elements. An above position transmitter having a Hall sensor can be provided in a simple manner on the cylinder for the relative travel measurement of the displacement of the pressing elements. The lever is preferably designed and arranged in such a way that the travel measurement takes place linearly in relation to the displacement of the pressing elements.

In the above crimping apparatus, during the crimping in particular of a predetermined cable with a predetermined contact sleeve, the pressing elements of the crimping device are moved toward one another with application of pressure. The contact sleeve provided with the cable is arranged between the pressing elements and is compressed with the cable under the pressure of the pressing elements. For a desirable mechanically and electrically stable connection, a predetermined suitable crimping height is provided, up to which the pressing elements act on the contact sleeve and the cable.

To set a predetermined crimping height, a setting mechanism is provided, according to which the crimping apparatus is suitable for various applications. In particular in an indent crimping apparatus such as a two-indent crimping apparatus and a four-indent crimping apparatus, the pressing elements are formed as opposing pointed mandrels. The above crimping height is the minimal distance between two opposing mandrels, up to which the mandrels are moved toward one another during the crimping. The setting mechanism can suitably have an adjustable stop for the lever, for example. In addition, the crimping apparatus can have a stripping device, which strips a predetermined cable or a core of a predetermined cable and provides it for a crimp with a predetermined contact sleeve.

As described at the outset for the method according to the invention, a setting of a suitable crimping height can be carried out in particular using a setting mechanism utilizing adjustment mandrels having a diameter suitable for a predetermined contact sleeve and a predetermined cable. A predetermined adjustment mandrel is arranged between the pressing elements of the crimping device and the pressing elements are moved out of the defined rest position thereof toward the adjustment mandrel until the tips of the pressing elements touch the adjustment mandrel. The crimping height is configured as described above when the adjustment mandrel is displaceable between the pressing elements touching it under a predetermined friction and corresponds here to the diameter of the adjustment mandrel.

An above crimping apparatus is therefore suitable for carrying out a method according to embodiments of the invention, wherein a software program suitable for carrying out the method can be suitably provided on the evaluation electronics unit of the crimping apparatus. It is clear that the evaluation electronics unit has means or devices suitable for this purpose, for example, a storage option for recording data.

A crimping apparatus particularly suitable for carrying out a method according to embodiments of the invention can suitably have, in addition to a travel sensor, additionally a force sensor, which can suitably be a piezoelectric sensor, suitable for measuring a force upon application of pressure to a crimping device.

A crimping apparatus having a travel sensor and force sensor is designed suitably for acquiring a force/travel curve upon an actuation of its crimping device. A statement about the quality of the crimp can be made by way of a comparison of a force/travel curve of a crimp to a reference model.

A suitable crimping apparatus can additionally have interfaces for wired and/or wireless signal and/or data connections. The crimping apparatus can be networked in this way, according to which, in step six of the method according to an embodiment of the invention, a predetermined report can be sent to an external device. For example, such an above report can take place to a mobile telephone of a service technician, according to which the option of an advantageously timely maintenance of the pressing elements of a crimping device is provided.

In particular an above crimping apparatus suitable for acquiring a force/travel curve of a crimp accordingly has an evaluation electronics unit and already has a suitable travel sensor. The crimping apparatus can therefore be retrofitted to carry out the method according to embodiments of the invention particularly simply and inexpensively by way of software installation of a software program suitable for carrying out the method without provision of additional hardware.

BRIEF DESCRIPTION OF THE SEVERAL VIEWS OF THE DRAWINGS

Exemplary embodiments of the invention are illustrated in the drawings and are explained in more detail hereinafter. In the figures.

The figures partially contain simplified schematic illustrations. Identical reference signs are partially used for equivalent, but possibly not identical elements. Various views of equivalent elements can be scaled differently. For the sake of simplicity and clarity, only one equivalent or similar element is provided with a reference sign in each of the drawings.

DETAILED DESCRIPTION

Figure 1A:
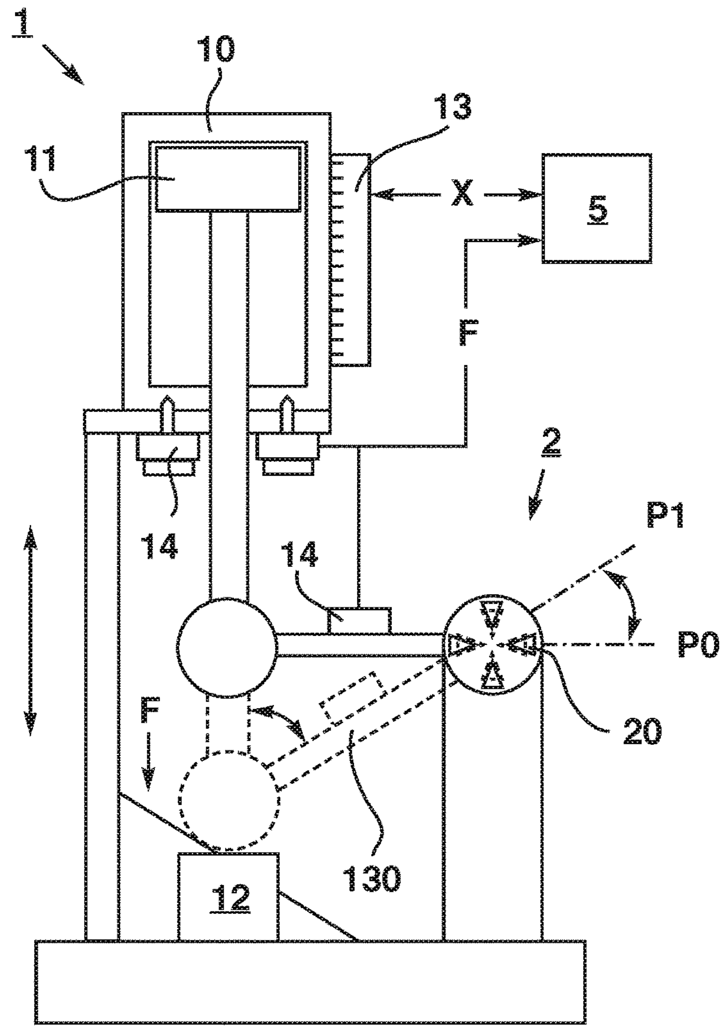
FIG. 1A shows a schematic illustration of a crimping apparatus according to one embodiment of the invention having a crimping device.
Figure 1C:
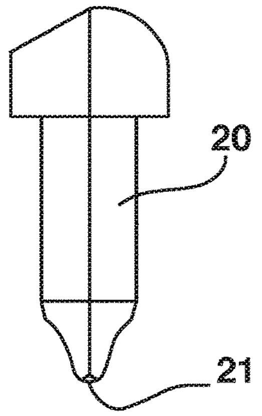
FIG. 1C shows a mandrel of the crimping device from FIGS. 1A and 1B in an enlarged illustration.
Figure 1B:
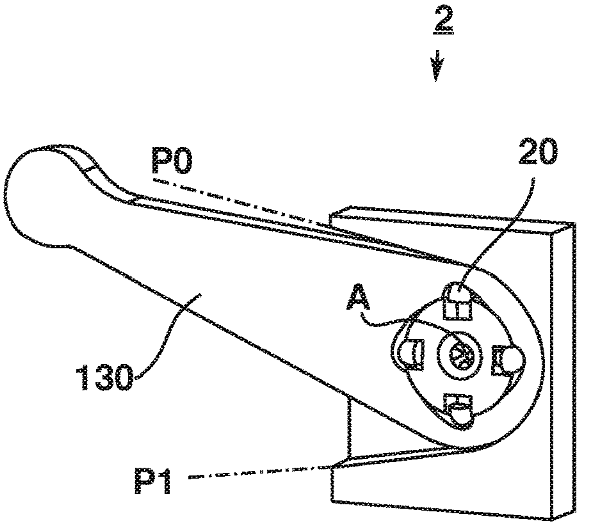
FIG. 1B shows the crimping device from FIG. 1A in an enlarged illustration.
Figure 1D:
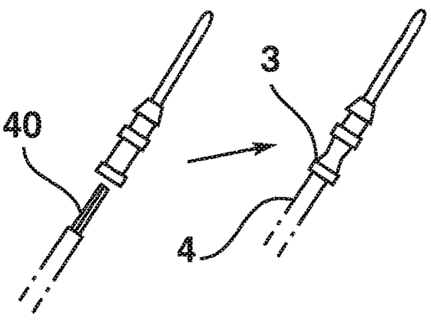
FIG. 1D shows a cable with a contact sleeve, loose and crimped with one another.

FIG. 1A shows a schematic illustration of a crimping apparatus 1 according to one embodiment of the invention, and FIG. 1D shows a cable 4 with a contact sleeve 3, respectively loose and crimped with one another. The contact sleeve 3 is a turned contact sleeve 3.

The crimping apparatus 1 is an indent crimping apparatus and in particular a four-indent crimping apparatus having a crimping device 2 having four pressing elements 20, which are particularly suitable for compressing a stripped cable or a strand of a stripped single-core cable 4 with a turned contact sleeve 3. The pressing elements 20 are suitably designed as pointed mandrels 20.

To actuate the crimping device 2, the crimping apparatus 1 has a pneumatic pressure device having a cylinder 10 and a piston 11, which is operationally connected via a lever 130 to the crimping device 2. For a configuration described at the outset of a predetermined crimping height by way of adjustment mandrels, a suitable setting mechanism 12 is provided, which can have an adjustable stop for the lever 130.

In the case of a crimp by way of compression of a contact sleeve 3, which is turned in particular, with a cable 4, the contact sleeve 3 with the strand of the cable 4 located therein is inserted as intended into the crimping device 2, and the crimping device 2 is actuated by way of the pressure device and pressure is applied thereto. The lever 130 coupled to the crimping device 2 is pivoted by way of a vertical movement and a vertically acting force F of the pressure device. The crimping device 2 and the lever 130 are designed and arranged in such a way that the mandrels 20 are moved toward one another from the rest position P0 thereof or moved into the rest position P0 thereof during a pivot, which is described hereinafter with reference to FIG. 1B. The tips 21 of the mandrels 20 are each located on concentric circles, which is described hereinafter with reference to FIGS. 2B and 2C.

The crimping apparatus 1 is suitably configured for checking the quality of a crimp of a predetermined cable 4 with a predetermined contact sleeve 3 and has for this purpose a travel sensor 13 and at least one force sensor 14. The travel sensor 13 can suitably be a position transmitter having a Hall sensor and can be provided on the cylinder 10 of the pressure device. The force sensor 14 can suitably be a piezoelectric sensor 14 and can be arranged on the lever 130 and/or can be at least one piezoelectric sensor provided on a fastening of the cylinder 10. The piezoelectric sensors each measure an elongation or tension during the actuation of the lever 130 or the counter force acting on the cylinder 10 of a pressure acting on the piston 11.

The sensor system 13, 14 is connected to transmit signals and/or data to an evaluation electronics unit 5. The evaluation electronics unit 5 can control a display screen and can display a force/travel curve G of a crimp, which is acquired using the signals of the sensor system 13, 14, together with further items of information on the display screen. Examples of a force/travel curve G are described hereinafter with reference to FIGS. 2A and 3A.

FIG. 1B shows an enlarged illustration in more detail of the crimping device 2 and FIG. 1C shows an enlarged mandrel 20 of the crimping device 2 from FIGS. 1A and 1B. For the sake of clarity, the force sensor 14 on the lever 130 is not shown in FIG. 1B.

The crimping device 2 has a cylindrical guide having the cylinder axis A, in which four mandrels 20 are mounted so they are radially movable. The tips 21 of the mandrels 20 are oriented toward one another. The lever 130 is axially pivotably or rotatably mounted on the cylindrical guide and has an inner contour which interacts with heads of the mandrels 20 protruding out of the cylindrical guide.

Upon a pivot of the lever 130, the tips 21 of the mandrels 20 are moved toward one another or away from one another in the direction of the axis A of the cylindrical guide or the pivot axis of the lever 130. The tips 21 of the mandrels 20 are each located on concentric circles. In a crimp, a contact sleeve 3 provided with a cable 4 is compressed with the cable 4 in this way by means of actuation of the lever 130 on the axis A of the cylindrical guide.

The crimping device 2 with its mandrels 20 is additionally described hereinafter with reference to FIGS. 2B, 2C, and 4A.

A crimping apparatus 1 having the above-described features is suitable for carrying out a method described at the outset and hereinafter also with reference in particular to FIG. 4, FIG. 4B, and FIG. 5.

Figure 2A:
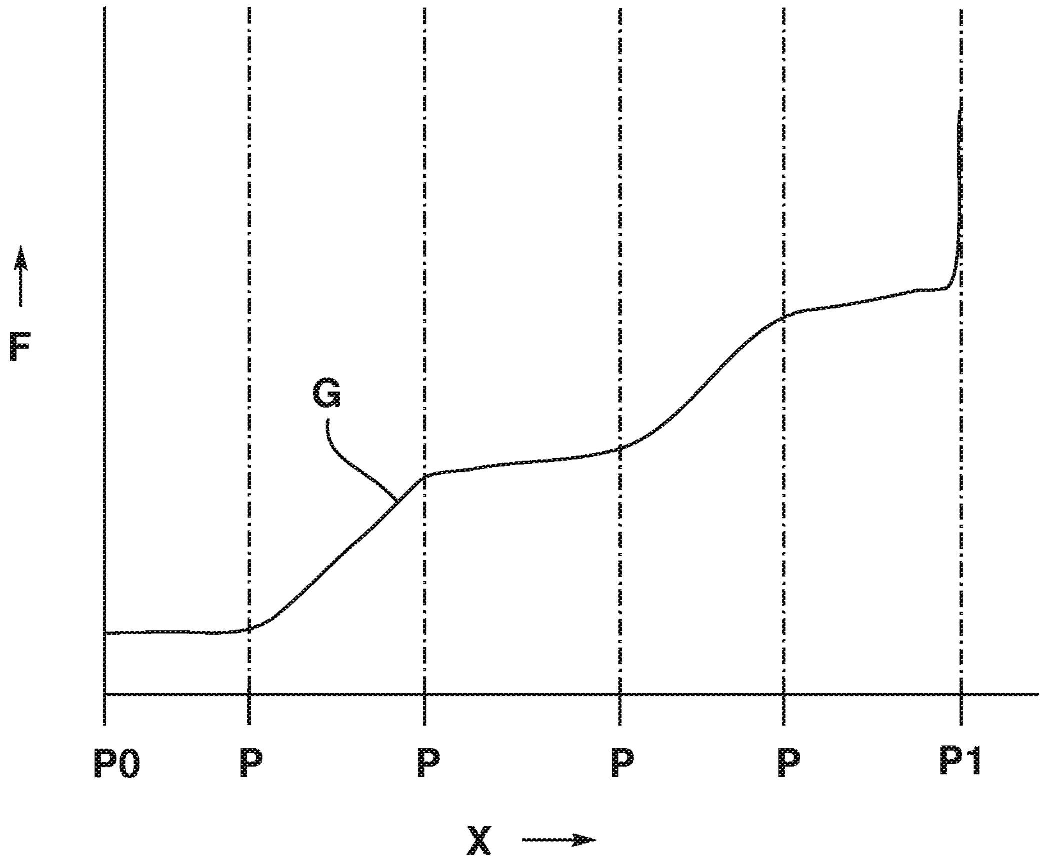
FIG. 2A shows a force/travel curve recorded using the crimping apparatus of a crimp according to one embodiment of the invention.

FIG. 2A shows a force/travel curve G of a crimp of a contact sleeve 3, which is carried out by way of a crimping apparatus 1 from FIG. 1A, with a cable 4 from FIG. 1D according to one embodiment of the invention.

The mandrels 20 of the crimping device 2 are moved during the crimp from the rest position P0 thereof into further positions P to P1, wherein the tips 21 of the mandrels 20 move toward one another and are each arranged on concentric circles. A travel X and a force F, which are represented by the force/travel curve G, are measured by the sensor system 13, 14. The positions P0, P, P1 each correspond to particularly characteristic positions P of the mandrels 20 for the course of the force/travel curve G and the analysis thereof to assess the quality of a crimp and each correspond to a measured travel X of the sensor 13.

Figure 2B:
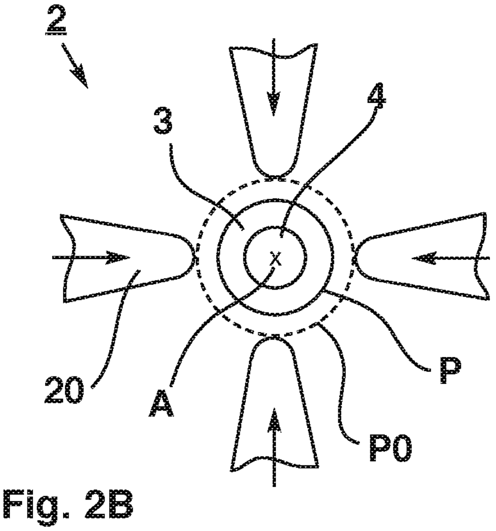
FIG. 2B shows an enlarged illustration of the crimping device from FIG. 1A in a first position, together with a contact sleeve arranged as intended for crimping and a cable.

FIG. 2B shows an enlarged illustration of the crimping device 2 from FIG. 1A in the rest position P0, together with a contact sleeve 3 arranged as intended for crimping in the crimping device 2 and a cable 4. The tips of the mandrels 20 of the crimping device 2 are arranged concentrically with the contact sleeve 3 and the cylindrical guide of the crimping device 2, which has the axis A.

A displacement of the mandrels 20 from the position P0 to the position P adjacent to the position P0 in FIG. 2A takes place using a constant force F. The course of the force/travel curve G is accordingly also constant in a first range P0-P between the position P0 and the position P of the mandrels 20, in which the mandrels 20 of the crimping device 2 touch the surface of the contact sleeve 3.

Figure 3A:
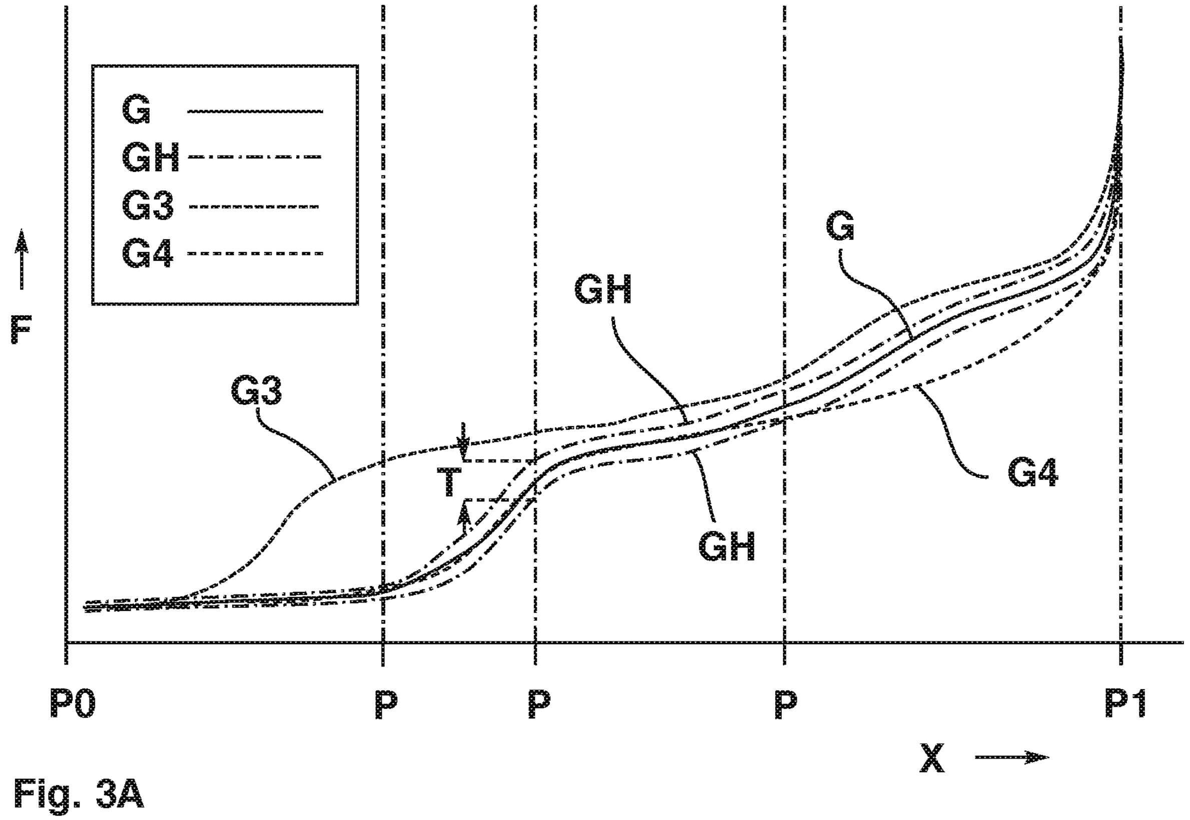
FIG. 3A shows further force/travel curves of a crimp together with two envelope curves of a reference model according to one embodiment of the invention.
Figure 3B:
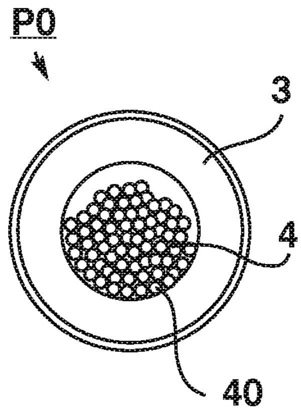
FIG. 3B shows an enlarged section through the contact sleeve provided as intended for the crimp with a cable from FIG. 2B.

FIG. 3B shows an illustration, which is enlarged and in more detail in relation to FIG. 2B, of a section through a contact sleeve 3 provided as intended for the crimp with a cable 4. The interior of the contact sleeve 30 has, in addition to individual wires 40 of the strand of the cable 4, a cavity not claimed by the individual wires 40 of the strand. The contact sleeve 3 is intact and its state corresponds to the contact sleeve 3 from FIG. 2B in the range P0-P of the crimp with the force/travel curve G.

Figure 2C:
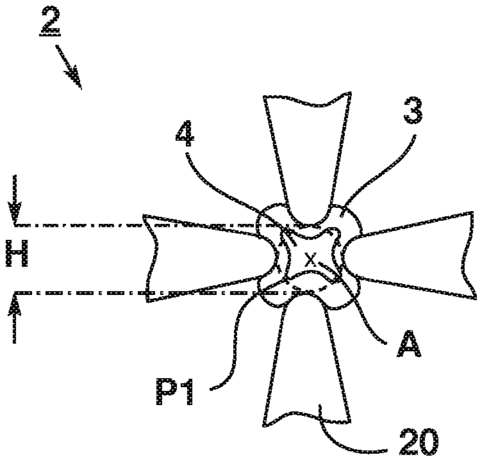
FIG. 2C shows the crimping device with the contact sleeve and the cable from FIG. 3B in a second position with a predetermined crimping height of the crimp.
Figure 3C:
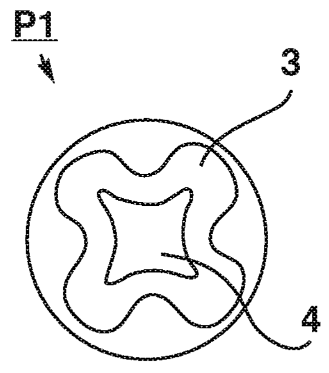
FIG. 3C shows a microsection of a section through the crimp of the contact sleeve with the cable from FIG. 2C.

FIG. 2C shows the mandrels 20 of the crimping device 2 at the position P1 of the mandrels 20 corresponding to the position P1 of the force/travel curve G, wherein the tips of the mandrels 20 are arranged on a circle having a diameter H, which corresponds to the set crimping height H. With the mandrels 20 arranged at the position P1, the strand completely fills up the available space in the contact sleeve 3. This state of the contact sleeve 3 and the strand is shown in a microsection of the contact sleeve 3 for the region P1 from FIG. 3C, in which no individual wires 40 of the strand are recognizable and no cavity is present in addition to the strand. FIG. 3C shows a microsection of a crimp having a desirable predetermined quality, in which no individual wires 40 or cracks in the contact sleeve 3 are recognizable due to, for example, undesired material deficiencies.

FIG. 3A shows further force/travel curves G, G3, and G4 of a crimp together with two envelope curves GH of a reference model, which is suitable for checking the quality of a crimp.

Figures 4A, 4B:
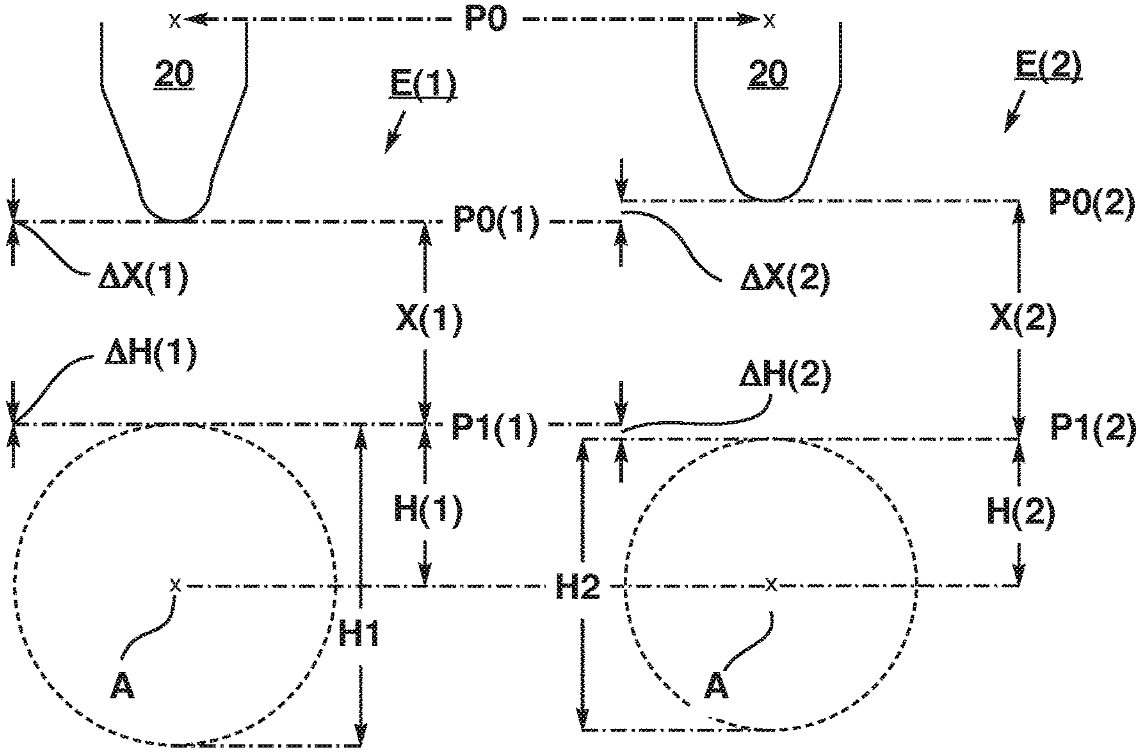
FIG. 4A shows an enlarged illustration of a pressing element of a crimping device in its rest position in a first and second operating state with a first and second configured crimping height.
FIG. 4B shows a tabular list of data measured and/or ascertained and/or recorded during a configuration of a crimping height.

The two envelope curves GH are each shown by dot-dash lines in FIG. 4A and delimit a tolerance range T. The force/travel curve G of FIG. 4A is shown by a solid line and lies in its entire course from the position P0 to the position P1 of the mandrels 20 between the envelope curves GH and corresponds to a crimp of a contact sleeve 3 with a cable 4 having a predetermined desirable quality, having a microsection as described above with reference to FIG. 3C. A crimp having such a desirable quality is achieved in particular using intact, undamaged pressing elements 20, whereupon monitoring of the state of the pressing elements 20 is desirable.

Figure 5:
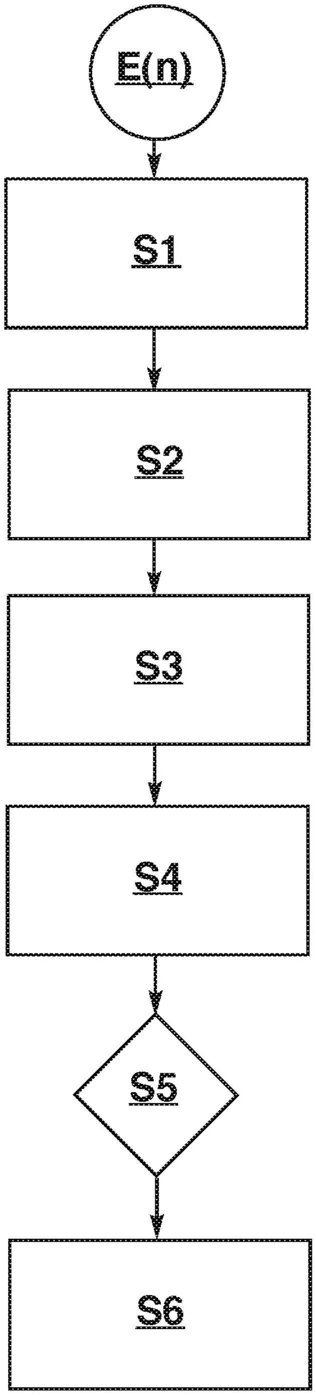
FIG. 5 shows a flow chart of a method for monitoring the state of a crimping device according to one embodiment of the invention.

FIG. 5 shows a flow chart of a method for monitoring the state of a crimping device 1 according to one embodiment of the invention. Reference is additionally made to FIG. 4A and the table of FIG. 4B to illustrate the method.

FIG. 4A shows an enlarged illustration of a pressing element 20 of a crimping device 2 in its rest position P0 in a first operating state having a first configured crimping height H(1) and in a second operating state having a second configured crimping height H(2). In the first operating state, the pressing element 20, which is formed as a pointed mandrel, is undamaged and/or new, and in the second operating state, the point of the pressing element 20 is worn.

The positions of the tips of the pressing element 20 define the positions P0(1) and P0(2).

FIG. 4B shows a tabular list of data measured and/or ascertained and/or calculated and/or recorded during a configuration of a crimping height.

As stated at the outset, for the sake of simplicity, a reference crimping height H(1) of an actual crimping height H1 or a reference crimping height H(2) of an actual crimping height H2 is respectively used as the crimping height H(1) and H(2), which each correspond to half the crimping height H1 and H2, and wherein the reference crimping heights H(1) and H(2) are referred to for the sake of simplicity and clarity as crimping height H(1) and H(2). The crimping heights H(3) and H(n) of Table 3 of FIG. 4B are also respectively a reference crimping height H(3) and H(n) referred to as the crimping height H(3) and H(n) for the sake of simplicity and clarity.

The pressing elements 20 of FIG. 4A are formed as pointed mandrels 20 and are suitable for a crimping device 1 of FIG. 1A.

In a first step S1 of the method of the embodiment of FIG. 5, during a configuration E(n), a configuration E(1), E(2), E(3), E(n) of a crimping height H(1), H(2), H(3), H(n) is respectively carried out. The pressing elements 20 of the configuration E(1) can be in a new and unused state, which is shown on the left side of FIG. 4A. The pressing elements 20 of the further configurations E(2), E(3), E(n) can be in a used and/or worn state, wherein the further configuration E(2) of a comparatively worn pressing element 20 is shown on the right side of FIG. 4A.

During a configuration E(n) of the configurations E(1), E(2), E(3), E(n), in a second step S2, a travel X(1), X(2), X(3), X(n) of the pressing elements 20 of the crimping device 1 from a first P0(*n*) to a second position P1(*n*) is measured, wherein the pressing elements 20 are in the rest position P0 thereof in the first position P0(*n*) and are in a working position P1 in the second position P1(*n*), which corresponds to the set crimping height H(n).

During a configuration E(n), in a third step S3, the comparison of the travel X(n) of the configuration E(n) to a travel X(n−1) of a configuration E(n−1) of a crimping height H(n−1) carried out before the configuration E(n) of the crimping height H(n) is carried out in a suitable way by means of subtraction of the measured travel, namely ΔX(n)=X(n)−X(n−1). In the first configuration E(1) of a crimping device having new pressing elements 20, this difference is ΔX(n)=0. In the second configuration E(2) of the crimping device 2 having used pressing elements 20, which correspondingly differ from the pressing elements 20 of the configuration E(1), this difference is ΔX(2)=X(2)−X(1).

The configuration E(n−1) is in this case respectively the last configuration carried out before the configuration E(n), wherein the travel X(n−1) of the configuration E(n−1) is read out in the third step S3 of the method from data recorded during the configuration E(n−1) in a fourth step S4.

In the fourth step S4, data for further configurations E(n) are recorded. The data can comprise at least the travel X(n) and/or the above travel difference ΔX(n) of a configuration E(n). Upon recording of the travel difference ΔX(n), the possibility is advantageously provided in the third step S3 of additionally summing over all recorded differences ΔX(n) of all configurations E(n) carried out, namely of forming the sum ΣΔX(n), wherein summing is carried out from 1 to n. In the first configuration E(1), ΣΔX(1)=0 and ΔX(1)=0 in this case.

In a fifth step S5, in each case a comparison of the difference ΔX(n) to a predetermined deviation is carried out and in a sixth step S6, a signal is output if the comparison fulfills a predetermined criterion. The above comparison carried out in the fifth step S5 can be ascertained here, for example, from the ratio and/or the difference of the deviation with/from the difference ΔX(n). The predetermined criterion can be a predetermined difference and/or a predetermined ratio.

The data read out in the third step S3 and/or the data recorded in the fourth step S4 of a configuration E(n) can moreover comprise, in addition to the travel X(n) and/or the difference ΔX(n), additionally the number n of the configurations E(n) carried out and/or the respective configured crimping height H(n).

It is additionally advantageous in the third step S3 to compare the crimping height H(n) to the second crimping height H(n−1), wherein the comparison can be derived from the ratio thereof and/or in particular the difference thereof, namely ΔH(n)=H(n)−H(n−1), wherein the data read out in step three and/or the data recorded in step S4 can additionally comprise the difference ΔH(n). In this way, the possibility is advantageously provided of carrying out a plurality of configurations E(n) having different crimping heights H(n). Monitoring of the operating state of the pressing elements 20 is therefore advantageously often also possible routinely upon configuration of different crimping heights H(n).

Otherwise, only one configuration E(n) of a crimping height H(n) can be used to carry out the method according to the invention, the crimping height of which corresponds to the crimping height H(1) of the first configuration (1). In the first configuration E(1), ΔH(1)=0 and ΔX(1)=0 in this case.

In this way, the possibility is additionally advantageously provided, in addition to the above-described sum ΣΔX(n) over all recorded differences ΔH(n), of summing all configurations E(n) carried out, namely forming the sum ΣΔH (n), wherein summing is performed from 1 to n. In the first configuration E(1), ΣΔH(1)=0 and ΔH(1)=0 in this case.

In addition, the data read out in step S3 and/or the data recorded in step S4 can suitably additionally comprise the sums ΣΔX(n) and ΣΔH(n), whereby the possibility is advantageously provided in step S3 of additionally taking into consideration ΔX(n) and ΔH(n) of all configurations by means of formation of the ratio and/or the sum thereof. The sum ΣΔH(n)+ΔX(n), namely ΣΔH(n)+ΔX(n), can suitably be formed here, wherein summing can be performed over all configurations E(n) carried out.

The sum ΣΔH(n)+ΔX(n) can be compared in the fifth step S5 to a predetermined deviation, wherein a signal is output in the sixth step S6, if this comparison fulfills a predetermined criterion. The data read out in the third step S3 and/or the data recorded in the fourth step S4 can suitably additionally comprise the sum ΣΔH(n)+ΔX(n) here.

The sum ΣΔH(n)+ΔX(n) is particularly advantageous for checking for the presence of a criterion of the comparison V having the predetermined deviation, because in this way arbitrarily many configurations E(n) having arbitrarily many crimping heights H(n) can be used for the method according to embodiments of the invention.

The data recorded in step S4 can be recorded suitably with respective association with a configuration E(n). For example, the recorded data of a configuration E(n), namely n, X(n), H(n) and/or ΔX(n) and/or ΔH(n) and/or ΣΔX(n) and/or ΣΔH(n) and/or ΣΔH(n)+ΔX(n) can be stored in tabular form here in corresponding lines and columns. FIG. 4B shows an example of retrievable stored data in a table.

Upon recording of the sum ΣΔH(n)+ΔX(n) of a configuration E(n), in addition all data can be erased which are associated with other configurations E(n). In this way, it is advantageously possible to keep a storage space required for the recorded data small.

A method according to embodiments of the invention can additionally have a further step in a suitable manner, in which the crimps C carried out after configuration E(n) of a crimping height H(n) are counted, namely the number #C(n), and the number #C(n) is recorded together with the above recorded data, whereupon the data read out in step S3 can additionally comprise the number #C(n).

In this way, the possibility is advantageously provided that the signal output in step S6 can comprise, in addition to a predetermined criterion and/or the sum ΣΔH(n)+ΔX(n), the number #C(n) and/or its sum Σ#C(n), whereupon during a configuration E(n) of a crimping height (n), an estimation can be performed of a suitability to be expected of the pressing elements for a number of crimps to be carried out. It is clear that during a configuration E(n) in step S4 of the method, the sum Σ#C(n) can respectively also be recorded.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for monitoring a degree of wear of pressing elements of a crimping device of an indent crimping apparatus, the method comprising:

configuring a first crimping height;

measuring a first travel from a first rest position to a first working position of the pressing elements, which corresponds to the first crimping height;

configuring a second crimping height that is different than the first crimping height;

measuring a second travel from a second rest position to a second working position of the pressing elements, which corresponds to the second crimping height;

comparing the second travel of the configuration of the second crimping height to a recorded travel of the measurement of the first travel of the configuration of the first crimping height previously carried out;

recording data, wherein the recorded data comprises at least the second travel and/or comprises at least one result of the comparison of the second travel of the configuration of the second crimping height to the recorded travel of the measurement of the first travel of the configuration of the first crimping height previously carried out;

checking the comparison for the presence of a predetermined criterion; and outputting a signal when the predetermined criterion is fulfilled.

2. The method as claimed in claim 1, wherein the data recorded additionally comprise the second crimping height and/or a result of a comparison of the second crimping height to the first crimping height previously carried out using the method.

3. A method for monitoring a degree of wear of the pressing elements of a crimping device of an indent crimping apparatus, the method comprising:

configuring E(n) a crimping height H(n), wherein n is the number of the configurations of a crimping height carried out using the pressing elements of the crimping device, and wherein configurations of the crimping height include at least a configuration of a first crimping height and a configuration of a second crimping height that is different than the first crimping height;

measuring a travel X(n) of the pressing elements of the crimping device from a first position P0(*n*) to a second position P1(*n*), wherein the pressing elements are in a rest position (P0) thereof in the first position P0(*n*) and are in a working position (P1) in the second position P1(*n*), which corresponds to the set crimping height H(n);

comparing the travel X(n) of the configuration E(n) to a travel X(n−1) of a configuration E(n−1) of a crimping height H(n−1) carried out before the configuration E(n) of the crimping height H(n) by subtraction of the measured travel (X) in accordance with the formula $$\Delta X(n)=X(n)-X(n-1);$$

recording data, wherein the recorded data comprises at least the travel X(n) and/or the difference ΔX(n);

comparing the difference ΔX(n) to a predetermined deviation; and outputting a signal when the comparison fulfills a predetermined criterion.

4. The method as claimed in claim 3, wherein the configuration E(n−1) is the configuration (E) carried out last before the configuration E(n), and the travel X(n−1) of the configuration E(n−1) is read out from data recorded during the configuration E(n−1).

5. The method as claimed in claim 3, wherein the data recorded and/or the data read out comprises, in addition to the travel X(n) and/or the difference ΔX(n), the number n and/or the crimping height H(n).

6. The method as claimed in claim 5, wherein in addition the crimping height H(n) is compared to the crimping height H(n−1) by subtraction in accordance with the formula $$\Delta H(n)=H(n)-H(n-1),$$

and wherein the data recorded and/or the data read out additionally comprises the difference ΔH(n).

7. The method as claimed in claim 6, wherein:

in addition a sum of all recorded differences ΔH(n) of all configurations E(n) which are carried out is calculated in accordance with the formula sum ΣΔH(n), wherein summing is carried out from 1 to n, and wherein the data recorded and/or the data read out additionally comprises the sum ΣΔH(n).

8. The method as claimed in claim 7, wherein:

the sum ΣΔH(n)+ΔX(n) is formed, and wherein a comparison of the sum ΣΔH(n)+ΔX(n) to the predetermined deviation is carried out, and a signal is output if the comparison fulfills a predetermined criterion, and wherein the data recorded and/or the data read out additionally comprises the sum ΣΔH(n)+ΔX(n).

9. The method as claimed in claim 3, wherein:

a sum of all recorded differences ΔX(n) of all configurations E(n) which are carried out is calculated in accordance with the formula sum ΣΔX(n), wherein summing is carried out from 1 to n, and wherein the data recorded and/or the data read out additionally comprises the sum ΣΔX(n).

10. The method as claimed in claim 3, wherein the recorded data are respectively recorded under association with a configuration E(n), wherein upon recording of the sum $\Sigma\Delta H(n)+\Delta X(n)$ of one configuration E(n) all data are erased which are associated with another configuration E(n).

11. The method as claimed in claim 3, further comprising:

wherein the number #C(n) of crimps carried out after configuration E(n) of a crimping height H(n) are counted, and the number #C(n) and/or the sum Σ#C(n) thereof of all configurations E(n) are recorded together with the data recorded, and wherein the data read out additionally comprises the number #C(n) and/or the sum Σ#C(n) thereof of all configurations E(n).

12. The method as claimed in claim 3, wherein the signal output comprises the predetermined criterion and/or the sum $\Sigma\Delta H(n)+\Delta X(n)$ and/or the number #C(n) and/or the sum Σ#C(n) thereof.

13. The method as claimed in claim 3, wherein a relative travel measurement of the travel (X), X(n) is carried out using a position transmitter having a Hall sensor.

14. The method as claimed in claim 3, wherein the method is used for monitoring the operating state of an indent crimping apparatus having a plurality of pressing elements, the pressing elements of which are formed as conically pointed mandrels.

15. A crimping apparatus for crimping a predetermined cable with a predetermined contact sleeve using a sensor for measuring a travel of a device for actuating and/or applying pressure to a crimping device and an evaluation electronics unit having the following features:

the crimping device is suitable for compressing the cable with the contact sleeve;

the device for actuating the crimping device has a pneumatic pressure device having a cylinder and a piston, which are operationally connected to the crimping device via a lever;

a setting mechanism is provided for setting a predetermined crimping height; and the crimping apparatus is configured suitably for carrying out a method comprising:

configuring a first crimping height;

measuring a first travel from a first rest position to a first working position of the pressing elements, which corresponds to the first crimping height;

configuring a second crimping height that is different than the first crimping height;

measuring a second travel from a second rest position to a second working position of pressing elements of the crimping device, which corresponds to the second crimping height;

comparing the second travel of the configuration of the second crimping height to a recorded travel of the measurement of the first travel of the configuration of the first crimping height previously carried out;

recording data, wherein the recorded data comprises at least the second travel and/or comprises at least one result of the comparison of the second travel of the configuration of the second crimping height to the recorded travel of the measurement of the first travel of the configuration of the first crimping height previously carried out;

checking the comparison for the presence of a predetermined criterion; and outputting a signal when the predetermined criterion is fulfilled.

16. The crimping apparatus as claimed in claim 15, additionally having a force sensor, whereupon the crimping apparatus is designed suitably for acquiring a force/travel curve.

17. The crimping apparatus as claimed in claim 15 having at least one Hall sensor for travel measurement.

18. The crimping apparatus as claimed in claim 15, wherein the crimping apparatus is an indent crimping apparatus and the contact sleeve is a turned contact sleeve.

* * * * *